United States Patent
McCormick

(10) Patent No.: US 12,127,555 B2
(45) Date of Patent: Oct. 29, 2024

(54) SHOCK ABSORBING DEVICE TO PROTECT CRYOPRESERVED BIOLOGICAL MATERIAL

(71) Applicant: BioLife Solutions, Inc., Bothell, WA (US)

(72) Inventor: Bruce McCormick, Santa Fe, NM (US)

(73) Assignee: BioLife Solutions, Inc., Bothell, WA (US)

( * ) Notice: Subject to any disclaimer, the term of this patent is extended or adjusted under 35 U.S.C. 154(b) by 812 days.

(21) Appl. No.: 16/843,493

(22) Filed: Apr. 8, 2020

(65) Prior Publication Data
US 2021/0315201 A1    Oct. 14, 2021

(51) Int. Cl.
| | |
|---|---|
| *A01N 1/00* | (2006.01) |
| *A01N 1/02* | (2006.01) |
| *B65D 81/02* | (2006.01) |
| *B65D 81/18* | (2006.01) |
| *B65D 81/38* | (2006.01) |

(52) U.S. Cl.
CPC ......... *A01N 1/0252* (2013.01); *A01N 1/0273* (2013.01); *B65D 81/022* (2013.01); *B65D 81/18* (2013.01); *B65D 81/3825* (2013.01); *B65D 81/3879* (2013.01)

(58) Field of Classification Search
None
See application file for complete search history.

(56) References Cited

U.S. PATENT DOCUMENTS

| | | | |
|---|---|---|---|
| 3,946,039 A * | 3/1976 | Walz | B22C 9/043 |
| | | | 264/44 |
| 5,419,152 A * | 5/1995 | Silber | B65D 81/3858 |
| | | | 62/457.2 |
| 5,626,814 A | 5/1997 | Vicino | |
| 10,882,684 B2 * | 1/2021 | Sollie | B65D 81/3858 |
| 2010/0011887 A1 * | 1/2010 | Burkhardt | G01N 21/0303 |
| | | | 422/400 |

(Continued)

FOREIGN PATENT DOCUMENTS

| | | |
|---|---|---|
| AT | 231090 | 2/2003 |
| CA | 3078995 A1 | 10/2020 |

(Continued)

OTHER PUBLICATIONS

International Search Report for PCT/US2021/026213 dated Jul. 28, 2021.

*Primary Examiner* — Jyoti Nagpaul
(74) *Attorney, Agent, or Firm* — Brown & Michaels, PC

(57) ABSTRACT

A shock absorbing device to protect cryogenically frozen biological material includes an outer sleeve and a foam sleeve. The outer sleeve defines an interior volume and has an opening configured to pass a biological material container into the interior volume. The foam sleeve is in the interior volume and has an opening and an interior cavity. The opening of the foam sleeve is aligned with the opening of the outer sleeve to pass the biological material container into the interior cavity. In another embodiment, the shock absorbing device includes a first layer, a foam layer, and a liner layer to retain the foam layer. A first side of the foam layer is adjacent and facing a second side of the first layer. A first side of the liner layer is adjacent and facing a second side of the foam layer.

27 Claims, 14 Drawing Sheets

(56) References Cited

U.S. PATENT DOCUMENTS

2016/0073626 A1   3/2016  Cutting et al.
2017/0343264 A1   11/2017  McCormick

FOREIGN PATENT DOCUMENTS

| CN | 202436012 U | 9/2012 |
| CN | 201320076367 U | 8/2013 |
| EP | 3243383 | 11/2017 |
| JP | 2003267471 A | 9/2003 |
| JP | 2017506097 A | 3/2017 |
| WO | 2013053011 A1 | 4/2013 |
| WO | WO 2013/053011 * | 4/2013 |

* cited by examiner

SHOCK ABSORBING DEVICE TO PROTECT CRYOPRESERVED BIOLOGICAL MATERIAL

BACKGROUND OF THE INVENTION

Field of the Invention

The invention pertains to the field of storage and transport of biological material, and more particularly, to a shock absorbing device to protect cryopreserved biological material.

Description of Related Art

Most or all biologic-based materials, including medicines, vaccines, cell and gene therapies, and engineered tissue products, are subject to hypothermic storage of varying duration to attempt to ensure survival, recovery during an ex vivo storage interval, and return to normal biologic function following an ex vivo storage interval. Current methods deploy various insulated shipping containers and biopreservation media of varying formulas. One method of storing and transporting blood or other biological fluid, for example, includes containing the fluid in deformable thermoplastic bags, which are then placed within a hard, typically metal, cassette. The cassettes provide an ability to organize and store the plastic bags in cryogenic freezers, as well as to provide protection for the bags. Typically the cassettes are sized to hold the plastic bags with minimal excess space to spread the biological fluid uniformly and facilitate a uniform rate of freezing and/or thawing.

Freezing some materials to cryogenic temperatures (e.g. temperatures to as low as −196 degrees Celsius or colder), including storage container material and biological material, can make the material brittle and susceptible to damage from shock normally encountered during transport. Thermoplastic bags containing biological fluid, as discussed in the example above, when frozen, can become brittle. A plurality of the frozen cassettes discussed above, containing the thermoplastic bags of biological fluid, can be secured within a dry vapor shipper to maintain the cryogenic temperature during shipping. Shock and vibration experienced by the dry vapor shipper can be transmitted to the plurality of cassettes and the plastic bags within, causing one or more of the plastic bags to fracture, resulting in a catastrophic loss of biological fluid. In the case of cell and gene therapy products, the lost fluid might have been a life-saving material made for a single patient at a very high monetary cost.

SUMMARY OF THE INVENTION

A shock absorbing device protects cryogenically frozen biological material by absorbing, dampening, or attenuating physical forces that would otherwise cause cryogenic storage and/or shipping materials to be damaged.

In an embodiment, the shock absorbing device includes an outer sleeve defining an interior volume and having an opening configured to pass a biological material container into the interior volume; and a foam sleeve in the interior volume, the foam sleeve having an opening and an interior cavity, the opening of the foam sleeve aligned with the opening of the outer sleeve to pass the biological material container into the interior cavity.

In another embodiment, the shock absorbing device includes a first layer having a first side and a second side; a foam layer having a first side and a second side, the first side of the foam layer adjacent and facing the second side of the first layer; and a liner layer to retain the foam layer, the liner layer having a first side and a second side, the first side of the liner layer adjacent and facing the second side of the foam layer.

DETAILED DESCRIPTION OF THE INVENTION

Figure 1:
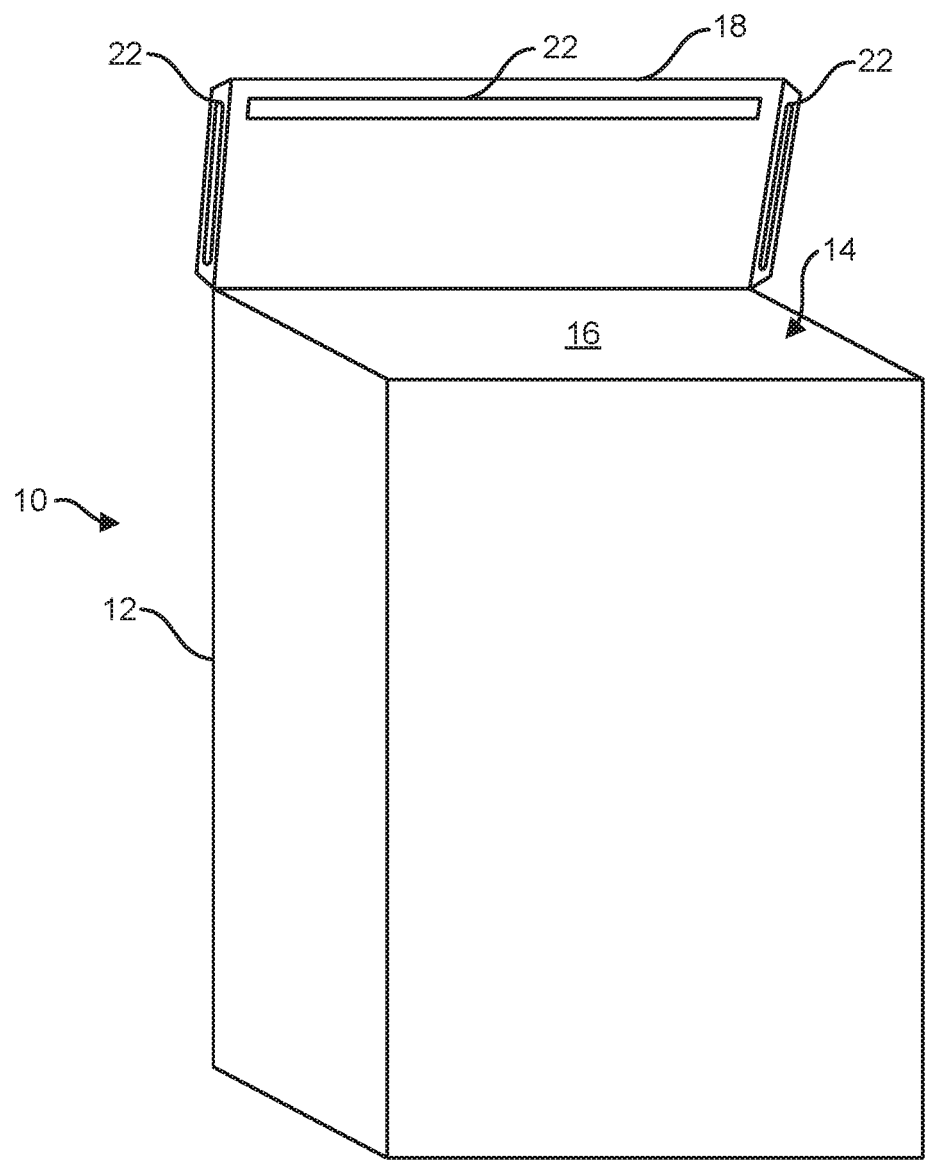
FIG. 1 illustrates an isometric view of a shock absorbing device, according to an embodiment.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "elastic deformation" is understood to be a reversible change in the dimensions of a material, in which the material has a first set of dimensions when no forces are applied to it, the material transitions to a second set of dimensions when forces are applied to it, and the material transitions back to its original set of dimensions when the forces are no longer applied. Such deformation includes but is not limited to changes in spatial dimensions and combinations thereof (e.g., changes in volume, cross-sectional profile, and diameter), and can result from forces including, but not limited to, forces of compression and/or stretching under tension.

As discussed above, a shock absorbing device protects cryogenically frozen biological material by absorbing, dampening, or attenuating physical forces that would otherwise cause cryogenic storage and/or shipping materials to be damaged. FIG. 1 illustrates an isometric view of a shock absorbing device 10. As seen in FIG. 1, the shock absorbing device 10 includes an outer sleeve 12. The outer sleeve 12 can be made from high density polyethylene fibers or another similarly strong, thin, flexible material. DuPont™'s Tyvek® is an example of a suitable material—a paper-like, flashspun high-density polyethylene fiber material, with nondirectional 0.5-10 μm fibers (plexifilaments) first spun and then bonded together by heat and pressure, without binders. The outer sleeve 12 is shown as a three-dimensional parallelepiped, to correspond with the shape of a particular metal cassette for storing cryogenically frozen bags of biological fluid (e.g., blood), though other shapes matching other cryogenic storage and shipping containers are conceived. The exterior dimensions of the outer sleeve 12 can be standardized to fit uniformly within dry vapor shipping containers or other equipment.

Figure 2:
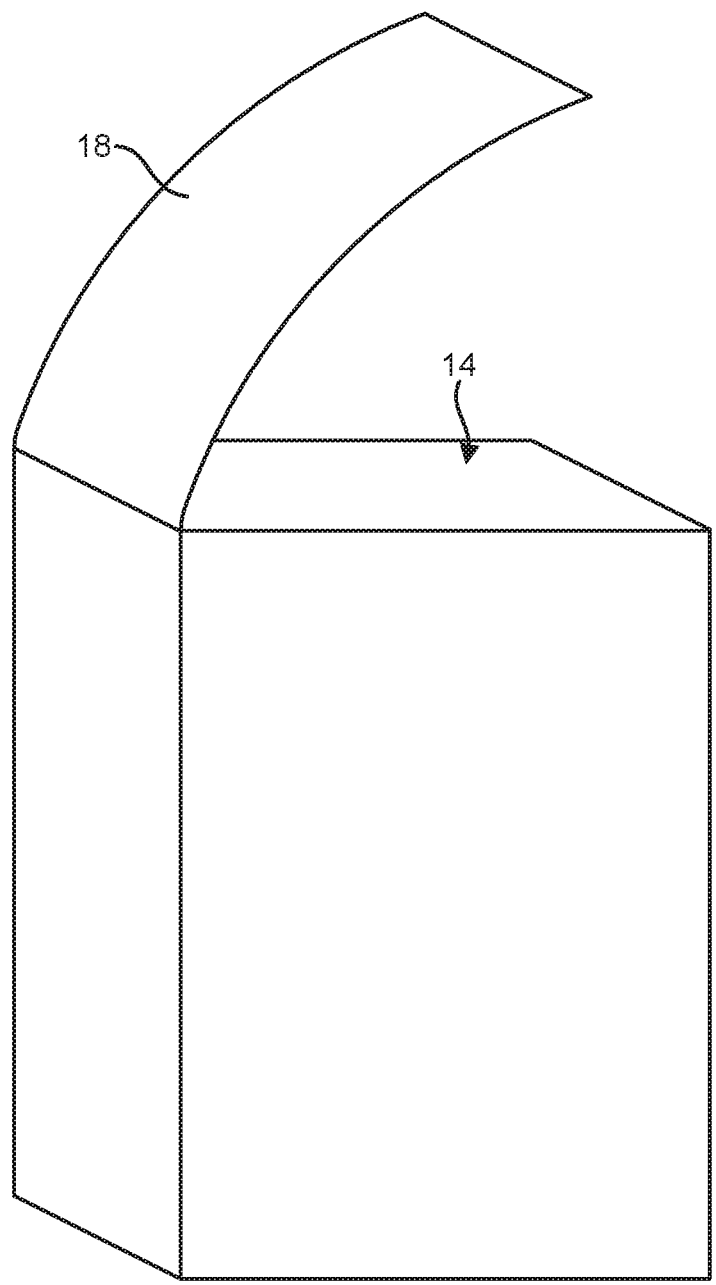
FIG. 2 illustrates an isometric view of a shock absorbing device, according to an embodiment.
Figure 3:
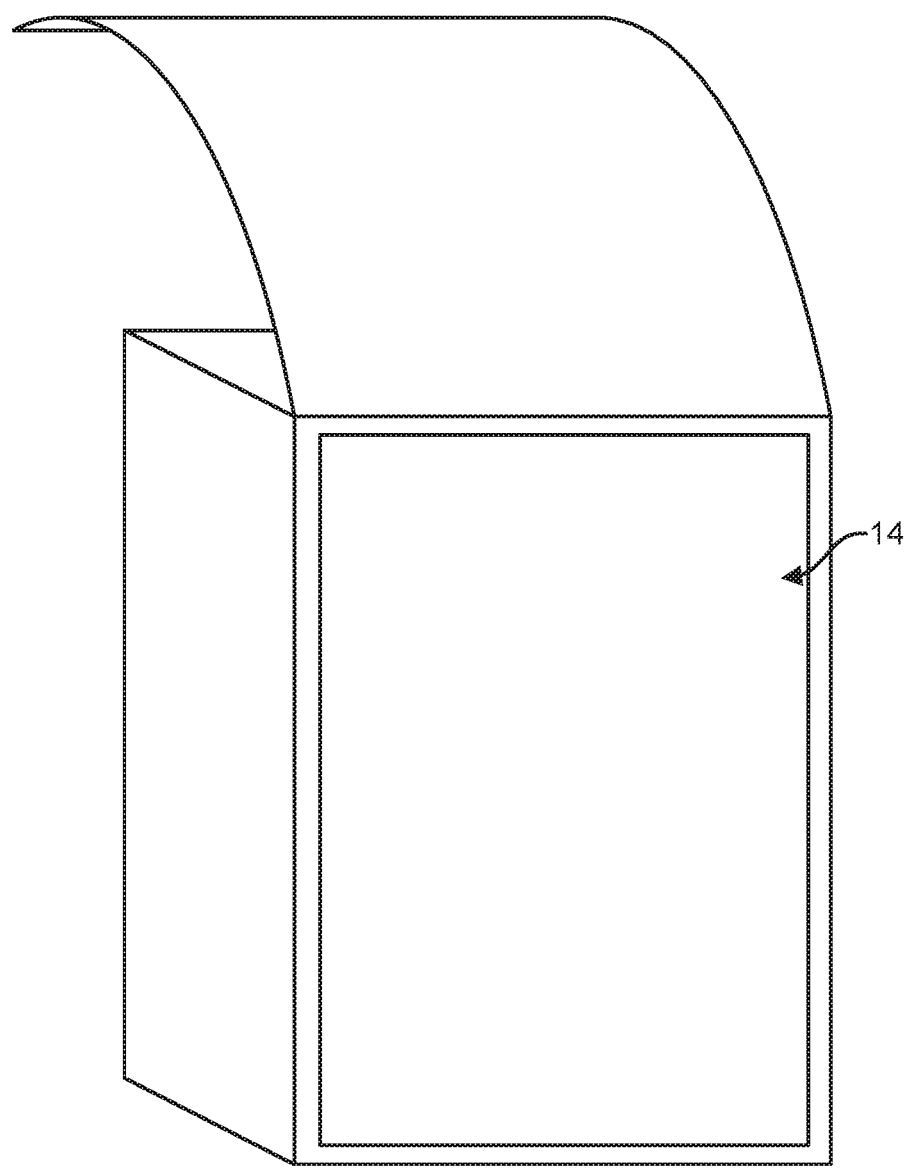
FIG. 3 illustrates an isometric view of a shock absorbing device, according to an embodiment.

The outer sleeve 12 can have an opening 14 configured to pass a biological material container (e.g., a cassette, not shown) into an interior volume 16. A securing element, such as flap 18 can be closed and/or sealed over the opening 14 to close the opening 14 and secure the biological material container therein. Any now-known or future developed fastening element can be used to close or seal, or in some embodiments re-close or re-seal, the flap 18, such as but not limited to hook and loop, adhesive, buttons, zippers, clips, magnets, and snaps. In the instant embodiment, the fastening element is a pressure sensitive adhesive 22 on the flap 18, which can seal the flap 18 to an outer surface of another portion of the outer sleeve 12. The flap 18 and opening 14 could be positioned alternatively, such as by turning the flap 18 perpendicularly from the orientation shown in FIG. 1, as illustrated in FIG. 2. FIG. 3 shows another example, wherein the flap 18 pulls open the largest side of the outer sleeve 12. The opening 14 can be configured in any practical manner to allow insertion and retention of a biological storage container, and any now-known or future-developed securing element to retain the biological material container can be used to close or seal the opening 14.

Figure 4:
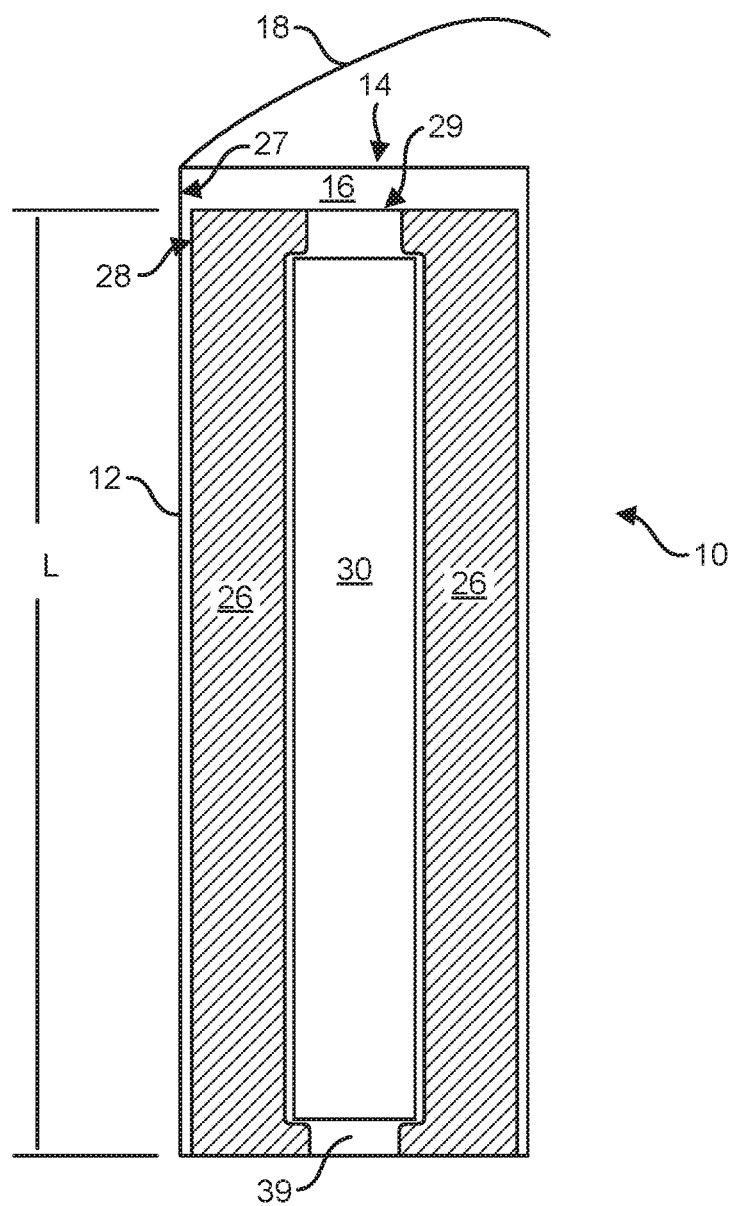
FIG. 4 illustrates a cross-section of the shock absorbing device of FIG. 1 along A-A.
Figure 5:
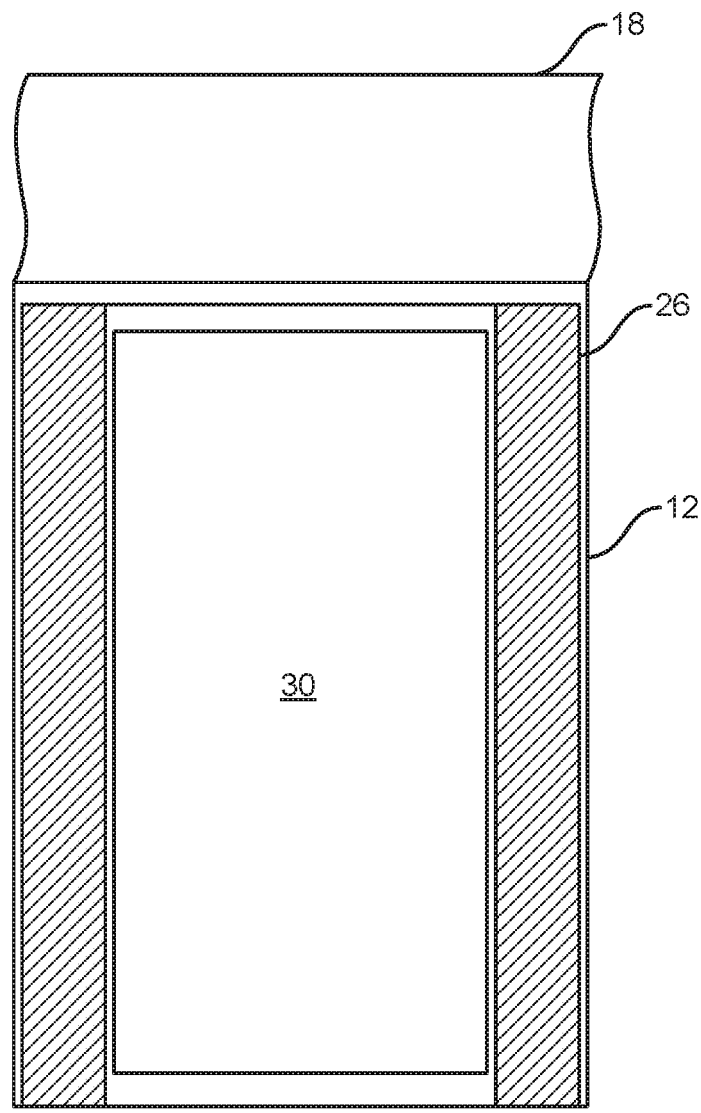
FIG. 5 illustrates a cross-section of the shock absorbing device of FIG. 1 along B-B.

FIG. 4 illustrates a cross-section of the shock absorbing device 10 of FIG. 1, and FIG. 5 illustrates a perpendicular cross-section of the shock absorbing device 10. A foam sleeve 26 is in the interior volume 16 of the outer sleeve 12, layered upon or lining an interior side 27 of the outer sleeve 12 such that an exterior side 28 of the foam sleeve 26 faces the interior side 27 of the outer sleeve 12 and an opening 29 of the foam sleeve 26 aligns with the opening 14 of the outer sleeve 12. The foam sleeve 26 acts as the primary shock absorbing or dampening material to absorb, dissipate, and/or attenuate physical force applied to the shock absorbing device 10 that otherwise would be transmitted to a biological material container 30 and/or biological material (not shown) contained therein.

Figure 6:
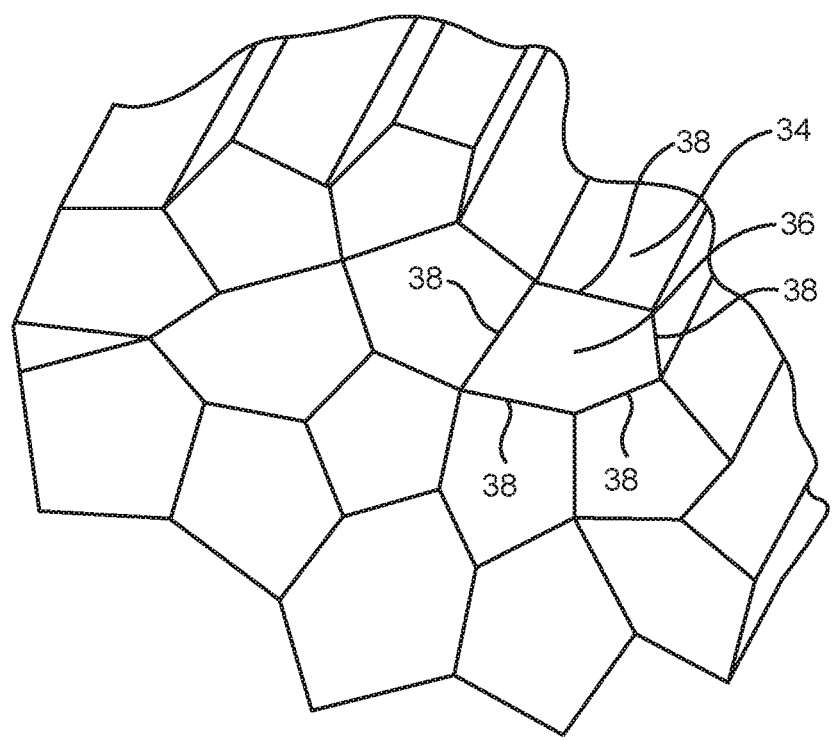
FIG. 6 illustrates a single layer of a structure of a foam material.

FIG. 6 illustrates a single layer of the structure of a foam material 32, which can be used to make the foam sleeve 26. As shown in FIG. 4, the foam of the foam sleeve 26 can have bubbles or cells 34 with polyhedra cell windows or faces 36 divided by lineal boundaries or edges 38. Density of the foam material 32 can be measured in pores per inch ("PPI"). In an embodiment, the foam sleeve 26 has density in the range of 10-40 PPI (approximately 3.94-15.75 pores per centimeter).

In some embodiments, the foam of the foam sleeve 26 can be or can include a reticulated foam. Reticulated foam is a very porous, low density solid foam. Reticulated foams have few, if any, intact cells (bubbles) 34 or polyhedra cell windows (faces) 36. In a reticulated foam only the lineal boundaries (edges) 38 where the cell windows 36 meet remain, and the polyhedra cell windows 36 are missing. The solid component of a reticulated foam may be an organic polymer like polyurethane, a ceramic, or a metal.

When at ambient temperatures, the foam sleeve 26 can be flexible and deformable, in which case the foam sleeve 26 can conform around a cryogenically frozen biological material or a cryogenically frozen container of biological material (such as the biological material container 30). During use of the shock absorbing container 10, the cryogenically frozen biological material and/or the container of cryogenically frozen biological material can be quickly placed through the opening 14 of the outer sleeve 12 and through the opening 29 of the foam sleeve 26 into an interior volume 39 of the foam sleeve 26. The foam sleeve 26 being unfrozen or at ambient temperature, can deform to the shape of the biological material container 30, and can quickly become rigid as the foam sleeve quickly cryogenically freezes. When the temperature of the foam sleeve 26 drops below a certain temperature, such as 0 degrees Celsius, the material becomes rigid. The rigid material has increased brittleness—more so with the net-like, low density structure of reticulated foam. In the frozen, brittle state, the foam sleeve 26 can endure small fractures in the faces 36 and/or edges 38, or in the case of reticulated foam, just the edges 38, during shocks or vibrations. These fractures absorb or dampen the shock or vibration forces, thereby attenuating or eliminating transmission of the forces to the biological material container 30 in the interior volume 39 and/or the biological material therein. Generally, faces 36 of non-reticulated foam can withstand a greater force before breaking than mere edges 38 of reticulated foam. Accordingly, reticulated foam can provide shock absorption of lower forces, and non-reticulated foam can provide shock absorption of higher forces.

Figure 7:
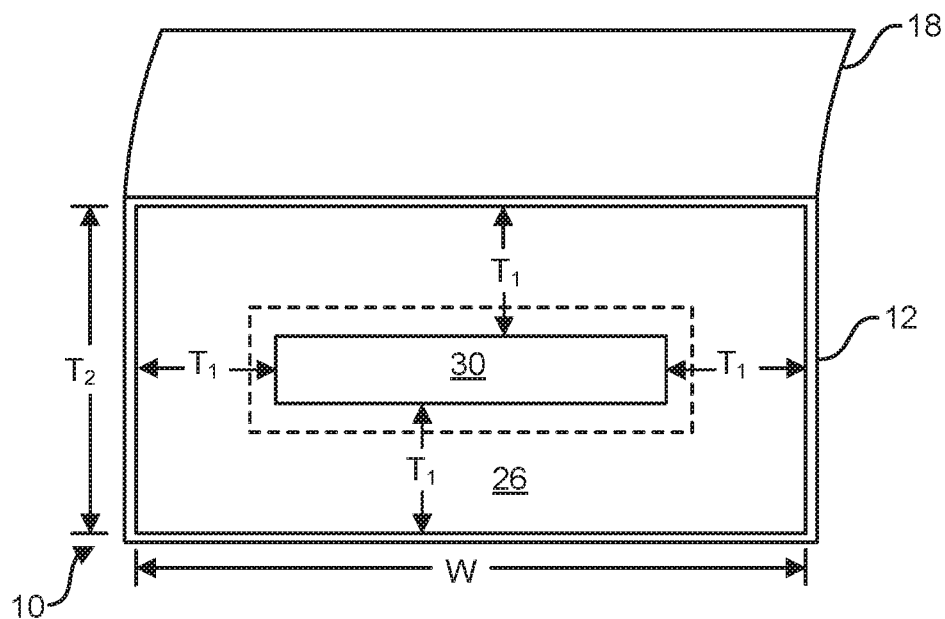
FIG. 7 illustrates an open end view of the shock absorbing device of FIG. 1, wherein a foam sleeve is a continuous single piece.
Figure 8:
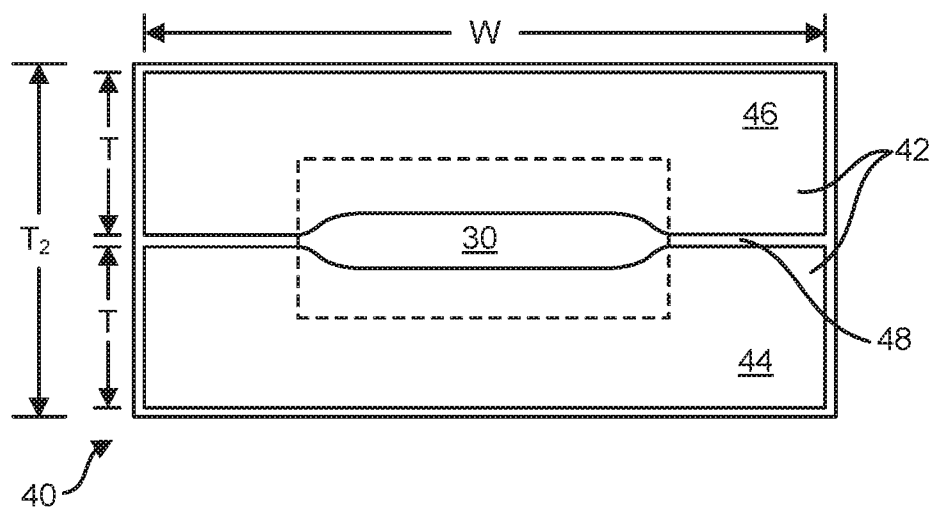
FIG. 8 illustrates an open end view of an embodiment of a shock absorbing device wherein a foam sleeve includes separated pieces.
Figure 9:
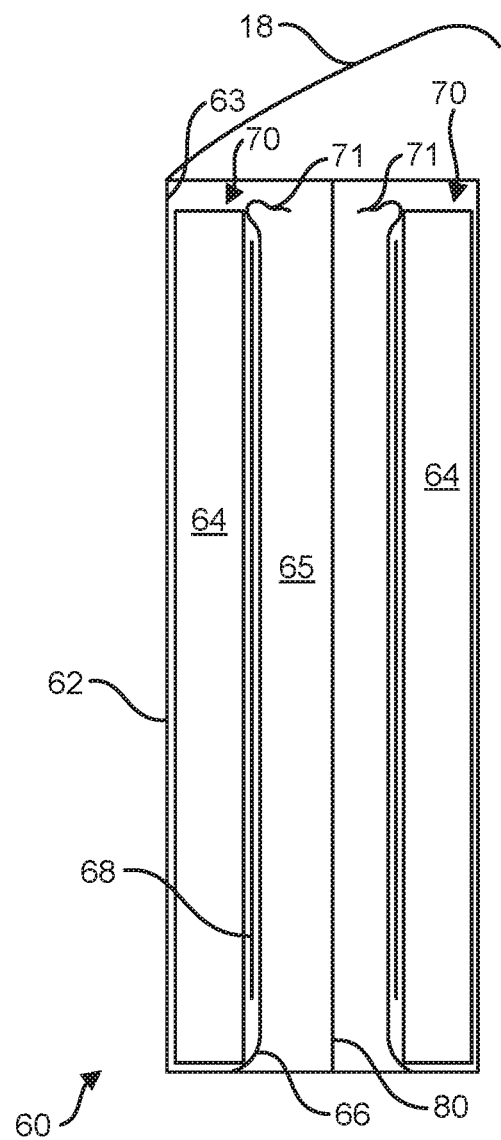
FIG. 9 illustrates a side view of an embodiment of a shock absorbing device looking through an outer sleeve to a foam sleeve, an inner liner, and a liquid-absorbing liner.

The foam sleeve 26 can entirely encircle the interior cavity 39 intended to snugly hold the biological material container 30, with one continuous piece or with a plurality of pieces; or the foam sleeve 26 can include separated pieces on opposing sides of the interior cavity 39. FIGS. 7 and 8, which are open end views of the shock absorbing device 10 and a shock absorbing device 40, respectively illustrate the foam sleeve 26 as a continuous single-piece, and a foam sleeve 42 as separated pieces 44, 46 on opposing sides of an interior cavity 48. In the embodiment of FIG. 7, the separated pieces 44, 46 of the foam sleeve 42 shown have a width W greater than the width of the biological material container 30 to provide impact protection and absorption in one direction all the way around the biological material container 30, though the separated pieces 44, 46 could also have a shorter width W than the biological material container 30. Further, the separated pieces 44, 46, being constrained in ability to expand or move outward by the outer sleeve 12, can press inwardly against the biological material container 30 with enough force to reduce or prevent movement of the biological material container 30 with respect to the separated pieces 44, 46. The separated pieces 44, 46 can each have a range of thickness T, with deformability for the thickness T to be compressed by the biological material container 30, such that any excess width W or length L (see FIG. 4) of the foam sleeve 42 beyond the width or length of the biological material container 30 has a greater thickness T than an area of the foam sleeve 42 compressed against the biological material container 30. The excess W or length L (see FIG. 4) act to enclose the foam sleeve 42 around the biological material container 30. In the top view of FIG. 8, a portion of the biological material container 30 is, accordingly, hidden behind the foam sleeve 42. This hidden portion is indicated by dotted lines.

Similarly, in the embodiment of FIG. 7, each wall of the foam sleeve 26 can have a range of thickness $T_1$, with deformability for the thickness $T_1$ to be compressed by the biological material container 30, such that any excess width W or length L (see FIG. 4) of the foam sleeve 26 beyond the width or length of the biological material container 30 has a greater thickness $T_1$ than an area of the foam sleeve 26 compressed against the biological material container 30. The excess W or length L act to enclose the walls of the foam sleeve 26 around the biological material container 30. In the top view of FIG. 7, a portion of the biological material container 30 is, accordingly, hidden behind the foam sleeve 26. This hidden portion is indicated by dotted lines.

In order to standardize the exterior dimensions of the outer sleeve 12 while accommodating biological material containers 30 of different sizes, a total thickness $T_2$ of the foam sleeve 26, 42 can be varied.

When at ambient temperatures, the foam sleeve 26 is flexible and deformable. During use of the shock absorbing device 10, a cryogenically frozen biological material container 30 encasing a cryogenically frozen bag of biological fluid is quickly placed through the opening 14 of the outer sleeve 12, through the opening 29 of the foam sleeve 26, into the interior cavity 32. The foam sleeve 26, being unfrozen or at ambient temperature, can deform to the shape of the biological material container 30, and can quickly become rigid as the foam sleeve quickly cryogenically freezes. When the temperature of the foam sleeve 26 drops below 0 degrees Celsius, the material becomes rigid. The rigid material increases brittleness, moreso with the net-like, low density structure of a reticulated foam. In the frozen, brittle state, the foam sleeve 26 endures small fractures in bubble faces, or in the case of reticulated foam, bubble edges or strands, during shocks or vibrations. These fractures absorb or dampen the shock or vibration forces without transmitting the forces to the biological material container 30 and the thermoplastic bags therein. In this manner, shock and vibration energy is dissipated, attenuating or preventing transmission of the shock to the biological material container 30 and its contents.

Additionally, the shock absorbing device 10 can include an inner liner and/or a liquid-absorbing liner. FIG. 9 illustrates a shock absorbing device 60 looking through an outer sleeve 62 to see a foam sleeve 64 similar or identical to the outer sleeve 12 and the foam sleeve 26, and to additionally see an inner liner 66 and a liquid-absorbing liner 68. The inner liner 66 is in an interior cavity 65 of the foam sleeve 64, and is configured to hold the foam sleeve 64 in place with respect to the outer sleeve 62. In the embodiment shown, the inner liner 66 is a pocket or pouch integrated with, or fastened to, an inner side 63 of the outer sleeve 62, and enclosing the foam sleeve 64. In some embodiments, the inner liner 66 entirely encloses the foam sleeve 64, while in other embodiments, the inner liner 66 encloses an amount of the foam sleeve 64 to merely retain the foam sleeve 64 in position with respect to the outer sleeve 62. The inner liner 66 can also hold broken strands of the foam sleeve 64, to collect the broken strands and reduce or prevent the debris from covering the biological material container (not shown in FIG. 9). A more open inner liner 66 could facilitate removal and replacement of the foam sleeve 64, to facilitate reuse of the shock absorbing device 60. A more enclosing inner liner 66 could facilitate better collection and retention of the broken debris. In the embodiment depicted in FIG. 9, in which the inner liner 66 entirely encloses the foam sleeve 64, the inner liner 66 includes a sealable or re-sealable opening 70 to allow complete enclosure of the foam sleeve 64 while also allowing removal and replacement of the foam sleeve 64. The opening 70 can be closed, for example, by fastening an end 71 of the inner liner 66 to the inner side 63 of the outer sleeve 62 using any suitable, now-known or future-developed fastening means.

The liquid-absorbing liner 68 in FIG. 8 is positioned adjacent an inner surface of the foam sleeve 64, and as such, is also held in place by the inner liner 66. The liquid-absorbing liner 68 can be any material suitable to absorb and hold liquids. The liquid-absorbing liner 68 is included, in some embodiments, at least in part, to meet regulatory requirements for shipment of infectious substances or exempt human specimens. In some embodiments, the liquid-absorbing liner 68 is configured with sufficient volume and absorbing capacity to fully absorb the volume of liquid contained within the biological material container (not shown in FIG. 9). In one embodiment, the biological material container can include or contain a bag of biological fluid, which can contain, for example, 25 mL to 250 mL of biological fluid. In some embodiments, one or more paper towels could suffice for the liquid-absorbing liner 68. To allow liquid outside the pocket or pouch defined by the inner liner 66 to reach liquid-absorbing liner 68, the inner liner 66 can be composed of a hydrophilic material with a porosity sufficient to allow liquids, such as liquid water or liquid nitrogen, to pass. A light weight, non-woven polyester could be suitable, for example.

Figure 10:
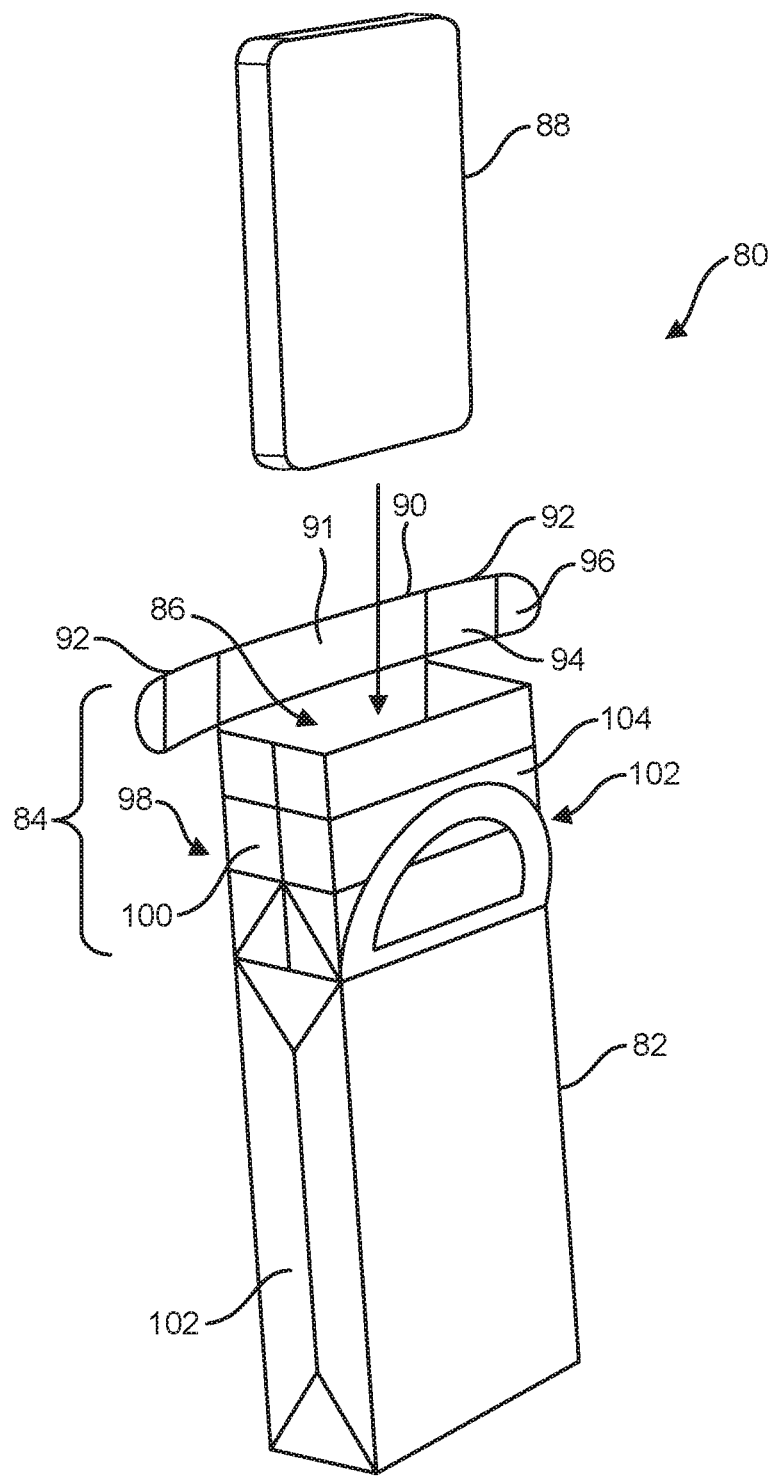
FIG. 10 illustrates another embodiment of a shock absorbing device including an alternative embodiment of an outer sleeve.

FIG. 10 illustrates an isometric view of another embodiment of a shock absorbing device 80, which includes an alternative embodiment of an outer sleeve 82. The outer sleeve 82 includes a foldable closing element 84 to close and seal an opening 86 after inserting a biological material container 88. The foldable closing element 84 includes a top flap 90 with a center portion 91 and side tabs 92 on a first side wall 98. The foldable closing element 84 also includes a second side wall 100 and a third side wall, each adjacent and connected directly to the first side wall 98, the second side wall 100 and the third side wall 102 opposite each other. A fourth side wall 104 is opposite the first side wall 98 and connected directly to the second side wall 100 and the third side wall 102.

Figure 11:
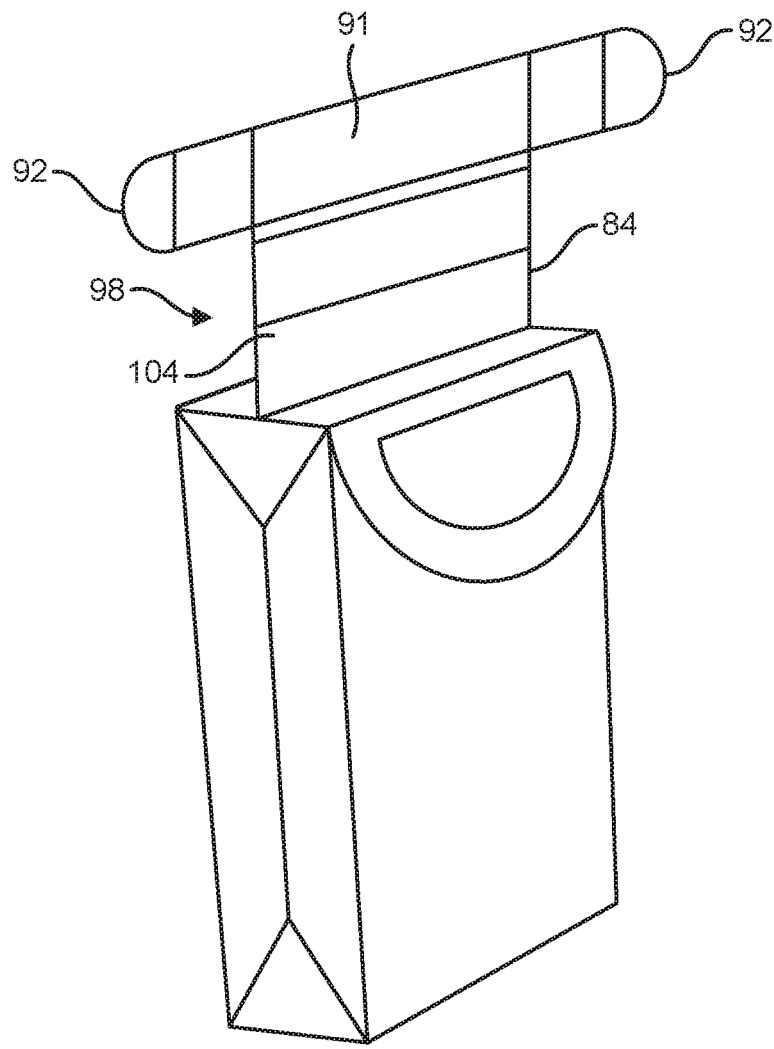
FIGS. 11-13 illustrate folding of a foldable closing element of the outer sleeve of FIG. 10 to close an opening of the outer sleeve.
Figure 12:
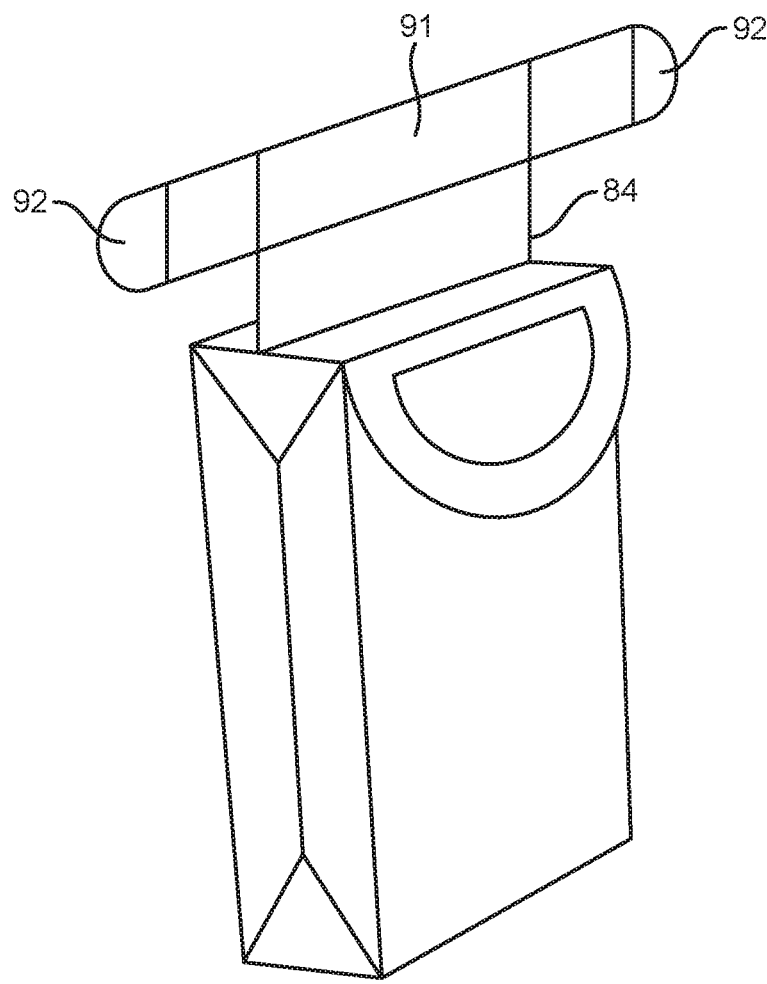
Figure 13:
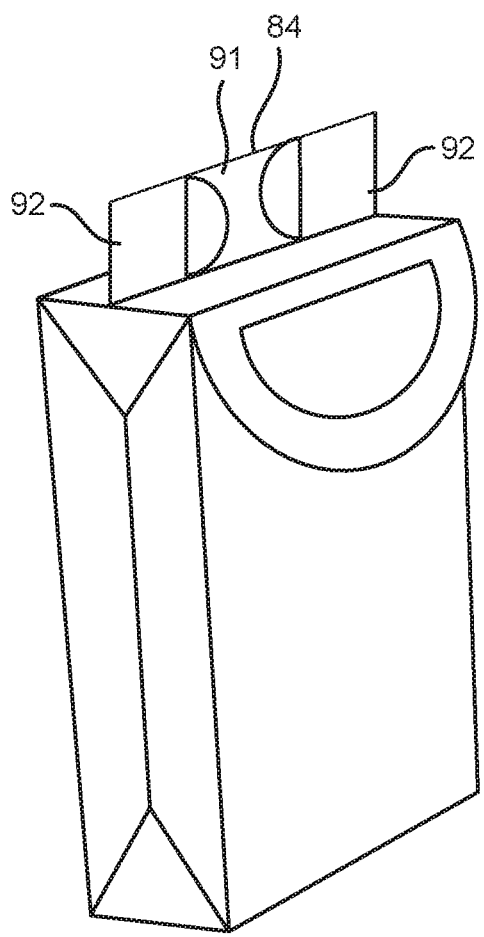

FIGS. 11-13 illustrate operation of the foldable closing element 84, in steps from FIG. 11 to FIG. 13. As seen in FIGS. 11-13, the second side wall 100 and the third side wall 102 can be bent or folded such that the first side wall 98 and the fourth side wall 104 can be pressed together. When the first side wall 98 and the fourth side wall 104 are pressed together, the center portion 91 of the top flap 90 can be folded onto the remainder of the foldable closing element 84, and then the remainder of the foldable closing element 84 can be folded multiple times to wrap around the center portion 91 of the top flap 90. The side tabs 92 can then be folded inward onto the folded, wrapped center portion 91 and adhered by any known adhesive or fastener.

The center portion 91 of the top flap 90 and/or other portions of the first side wall 98 and/or the fourth side wall 104 can include adhesive to adhere and/or seal the first side wall 98 to the fourth side wall 104. The first, second, third, and fourth side walls 98, 100, 102, 104 can be pre-creased as shown in FIG. 10 to aid or guide the user in bending and/or folding.

Figure 14:
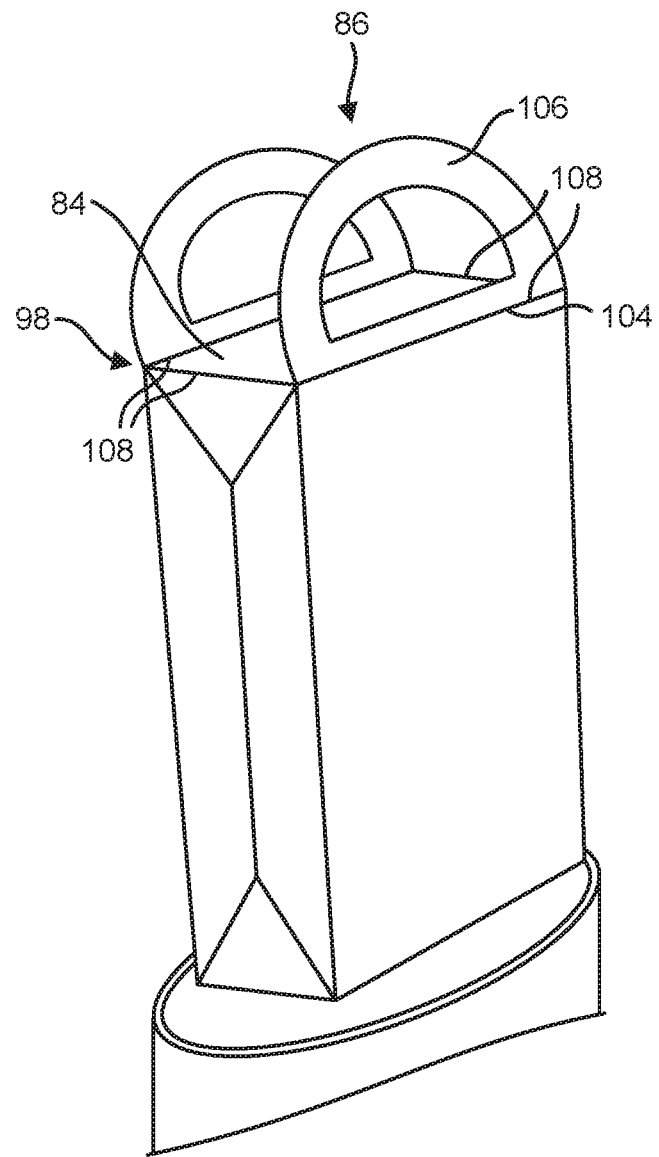
FIG. 14 illustrates handles of the shock absorbing device of FIG. 10, wherein the handles are positioned for use.

FIG. 14 illustrates handles 106 attached to the first side wall 98 and the fourth side wall 104 at a base 108 of the foldable closing element 84. The handles 106 can be rotated from the base 108 over the closed opening 86 and folded closing element 84 such that a user can carry the shock absorbing device 80.

Figure 15:
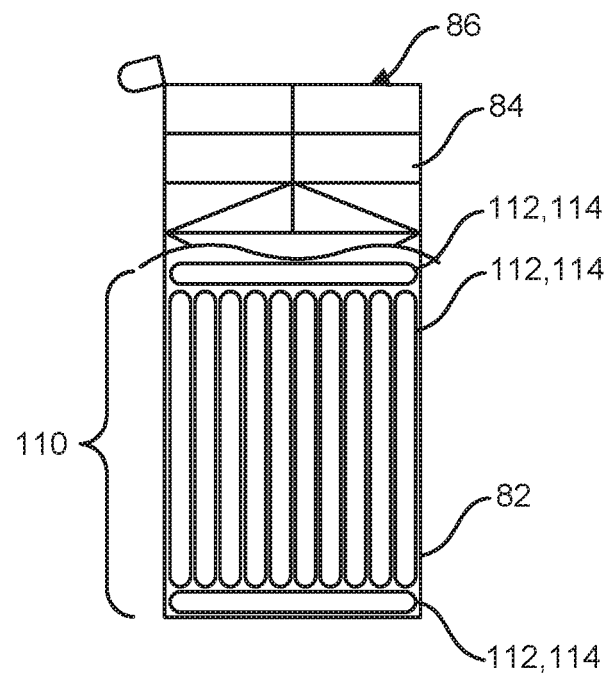
FIG. 15 illustrates a side view of an alternative embodiment of a foam sleeve in the outer sleeve of FIG. 10, wherein the outer sleeve is partially cut-away to show the foam sleeve which includes a plurality of foam panels.

FIG. 15 illustrates a side view of an alternative embodiment of a foam sleeve 110 in the outer sleeve 82, wherein the outer sleeve 82 is partially cut-away to reveal the foam sleeve 110. The foam sleeve 110 includes a plurality of foam panels 112 (see FIG. 16) each enclosed in a separate panel-enclosing liner 114. The foam panels 112 and liners 114 are on all interior sides of the outer sleeve 82 except the side with the opening 86. The side with the opening 86 can be covered with a foam panel 112 and a liner 114 also, after the biological material container (not shown in FIG. 15) is inserted into the outer sleeve 82, after the other foam panels 112 and liners 114 are inserted, and before the foldable closing element 84 is folded to close the opening 86. The foam panels 112, and corresponding liners 114, can vary in size and arrangement as desired.

Figure 16:
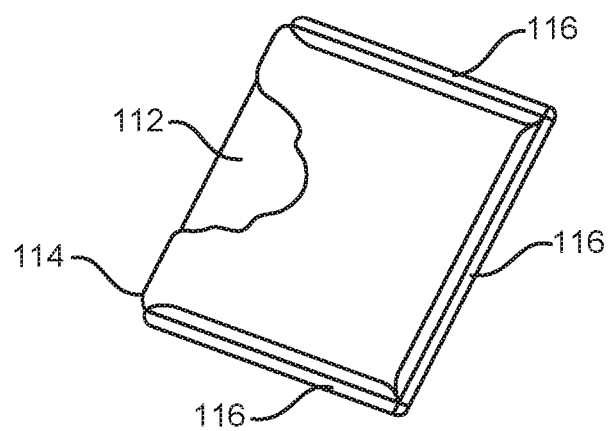
FIG. 16 illustrates a partial cut-away view of one of the foam panels of FIG. 15 enclosed entirely by one of the liners of FIG. 15.

FIG. 16 illustrates one of the foam panels 112 enclosed entirely by one of the panel-enclosing liners 114, with a portion of the panel-enclosing liner 114 cut away to reveal the foam panel 112 inside. The panel-enclosing liner 114 is a sheet bent in half around the foam panel 112, and fastened or sealed around the three non-bent edges to form a seam 116. A liquid-absorbing liner 68 (not shown in FIG. 15) can also be included adjacent each foam panel 112, as shown and described with respect to other embodiments. The panel-enclosing liners 114, as with the inner liners 66 described with respect to other embodiments, can also hold broken strands of the foam panels 112, to collect the broken strands and reduce or prevent the debris from covering the biological material container. The panel-enclosing liner 114 can also be unsealable or re-sealable, to allow complete enclosure of the foam sleeve 64 while also allowing removal and replacement of the foam panel 112. To allow liquid outside the panel-enclosing liner 114 to reach a liquid-absorbing liner 68 within the panel-enclosing liner 114, the panel-enclosing liner 114 can be composed of a hydrophilic material with a porosity sufficient to allow liquids, such as liquid water or liquid nitrogen, to pass. A light weight, non-woven polyester could be suitable, for example.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A shock absorbing device to protect cryogenically frozen biological material comprising:
   an outer sleeve defining an interior volume and having an opening configured to pass a biological material container into the interior volume; and
   a foam sleeve in the interior volume, the foam sleeve including a reticulated foam and having an opening and an interior cavity, the opening of the foam sleeve aligned with the opening of the outer sleeve to pass the biological material container into the interior cavity.

2. The shock absorbing device of claim 1, wherein the outer sleeve is comprised of a thin, flexible material.

3. The shock absorbing device of claim 1, wherein the foam sleeve lines an interior side of the outer sleeve.

4. The shock absorbing device of claim 3, further comprising a liner between the interior cavity and the foam sleeve, the liner fastened to the outer sleeve.

5. The shock absorbing device of claim 1, wherein the outer sleeve and the foam sleeve are configured and sized to compress the biological material container.

6. The shock absorbing device of claim 1, wherein the outer sleeve includes a first wall and a sealable flap, the sealable flap having a center portion and a side tab, the center portion extending from an edge of the first wall, the side tab extending freely from an edge of the center portion intersecting with the edge of the first wall such that the side tab is configured to fold back onto the center portion.

7. The shock absorbing device of claim 1, wherein the biological material container containing biological material includes a cassette.

8. The shock absorbing device of claim 1, wherein the biological material is a fluid.

9. The shock absorbing device of claim 1, further comprising a liquid-absorbing liner adjacent an inner surface of the foam sleeve.

10. The shock absorbing device of claim 1, wherein the outer sleeve includes an inner pouch enclosing the foam sleeve.

11. The shock absorbing device of claim 1, wherein the foam sleeve entirely encircles the interior cavity.

12. The shock absorbing device of claim 1, wherein the foam sleeve only partly encircles the interior cavity.

13. The shock absorbing device of claim 1, further comprising a hydrophilic liner between the interior cavity and the foam sleeve.

14. The shock absorbing device of claim 1, wherein the outer sleeve is a paper-like, flashspun high-density polyethylene fiber material.

15. A shock absorbing device to protect cryogenically frozen biological material comprising:
 a first layer having a first side and a second side;
 a foam layer having a first side and a second side, the first side of the foam layer adjacent and facing the second side of the first layer;
 a liner layer to retain the foam layer, the liner layer having a first side and a second side, the first side of the liner layer adjacent and facing the second side of the foam layer, the liner layer attached to the first layer; and
 a liquid-absorption layer between the foam layer and the liner layer and having a first side and a second side, the first side of the liquid-absorption layer adjacent and facing the second side of the foam layer.

16. The shock absorbing device of claim 15, wherein the foam layer is reticulated.

17. The shock absorbing device of claim 15, wherein the first layer is annular and defines an interior volume, the first side of the first layer faces outward, and the second side of the liner layer faces inward and defines an interior cavity within the interior volume, the interior cavity configured to receive an inserted biological material storage container.

18. The shock absorbing device of claim 15, wherein the first layer includes a sealable, openable, and re-sealable flap configured to be opened to receive an inserted biological material storage container and closed to secure the inserted biological material storage container.

19. The shock absorbing device of claim 18, wherein the sealable, openable, re-sealable flap includes a center portion and a side tab, the center portion extending from an edge of the first layer, the side tab extending freely from an edge of the center portion intersecting the edge of the first layer such that the side tab is configured to fold back onto the center portion.

20. The shock absorbing device of claim 15, having a shape of a rectangular parallelepiped.

21. A shock absorbing device to protect cryogenically frozen biological material comprising:
 an outer sleeve defining an interior volume and having an opening configured to pass a biological material container into the interior volume; and
 a plurality of foam panels configured to be inserted into and removed from the interior volume each foam panel including a reticulated foam.

22. The shock absorbing device of claim 21, wherein the foam panels are connected.

23. The shock absorbing device of claim 21, wherein each foam panel is separately and entirely enclosed in a panel-enclosing liner.

24. The shock absorbing device of claim 21, wherein each foam panel is at least mostly enclosed in a panel-enclosing liner and is adjacent a liquid-absorbing liner in the panel-enclosing liner.

25. The shock absorbing device of claim 21, wherein the outer sleeve includes a top flap configured to be folded onto an opposing wall, the top flap having a first tab and a second tab, the first tab and the second tab extending from opposite ends of the top flap and configured to remain free when the top flap is folded onto the opposing wall.

26. A shock absorbing device to protect cryogenically frozen biological material comprising:
 a first layer having a first side and a second side;
 a foam layer having a first side and a second side, the first side of the foam layer adjacent and facing the second side of the first layer;
 a liner layer to retain the foam layer, the liner layer having a first side and a second side, the first side of the liner layer adjacent and facing the second side of the foam layer, the liner layer attached to the first layer; and
 a liquid-absorption layer between the foam layer and the liner layer and having a first side and a second side, the first side of the liquid-absorption layer adjacent and facing the second side of the foam layer,
 wherein the first layer includes a sealable, openable, and re-sealable flap configured to be opened to receive an inserted biological material storage container and closed to secure the inserted biological material storage container.

27. A shock absorbing device to protect cryogenically frozen biological material comprising:
 a first layer having a first side and a second side;
 a foam layer having a first side and a second side, the first side of the foam layer adjacent and facing the second side of the first layer;
 a liner layer to retain the foam layer, the liner layer having a first side and a second side, the first side of the liner layer adjacent and facing the second side of the foam layer, the liner layer attached to the first layer; and
 a liquid-absorption layer between the foam layer and the liner layer and having a first side and a second side, the first side of the liquid-absorption layer adjacent and facing the second side of the foam layer,
 the shock absorbing device having a shape of a rectangular parallelepiped.

* * * * *